United States Patent [19]
Gupta et al.

[11] Patent Number: 5,941,983
[45] Date of Patent: Aug. 24, 1999

[54] OUT-OF-ORDER EXECUTION USING ENCODED DEPENDENCIES BETWEEN INSTRUCTIONS IN QUEUES TO DETERMINE STALL VALUES THAT CONTROL ISSURANCE OF INSTRUCTIONS FROM THE QUEUES

[75] Inventors: Rajiv Gupta, Los Altos, Calif.;
William S. Worley, Jr., Denver, Colo.

[73] Assignee: Hewlett-Packard Company, Palo Alto, Calif.

[21] Appl. No.: 08/881,244

[22] Filed: Jun. 24, 1997

[51] Int. Cl.$^6$ ........................................ G06F 9/38
[52] U.S. Cl. .................... 712/214; 395/706; 712/216; 712/23
[58] Field of Search .................... 395/706, 390, 395/392, 800.23; 712/214, 216, 23

[56] References Cited

U.S. PATENT DOCUMENTS

| | | | |
|---|---|---|---|
| 4,829,422 | 5/1989 | Morton et al. | 709/7 |
| 5,150,470 | 9/1992 | Hicks et al. | 712/217 |
| 5,465,372 | 11/1995 | Gottlieb et al. | 712/25 |
| 5,517,628 | 5/1996 | Morrison et al. | 712/234 |
| 5,627,982 | 5/1997 | Hirata et al. | 212/206 |
| 5,765,035 | 6/1998 | Tran | 712/216 |

OTHER PUBLICATIONS

A Strategy for Avoiding Pipeline Interlock Delays in a Microprocessor, 1990 IEEE International Conference on Computer Design: VLSI in Computers and Processors, Yoshida et al., Cambridge, MA (1990).

An Experimental Single–Chip Data Flow CPU, Uvieghara et al., IEEE Journal of Solid–State Circuits, vol. 27, No. 1, Jan. 1992.

The Horizon Supercomputing System: Architecture and Software, Kuehn and Smith, Supercomputing '88 (IEEE), Nov. 1988.

Compiling on Horizon, Draper, Supercomputer '88 (IEEE), Nov. 1988.

A Processor Architecture for Horizon, Thistle and Smith, Supercomputer '88 (IEEE), Nov. 1988.

The Cydra™ 5 Strideinsensitive Memory System, Rau et al., 1989 International Conference on Parallel Processing, 1989.

*Primary Examiner*—Kenneth S. Kim

[57] ABSTRACT

A method for executing instructions out-of-order to improve performance of a processor includes compiling the instructions of a program into separate queues along with encoded dependencies between instructions in the different queues. The processor then issues instructions from each of these queues independently, except that it enforces the encoded dependencies among instructions from different queues. If an instruction is dependent on instructions in other queues, the processor waits to issue it until the instructions on which it depends are issued. The processor includes a stall unit, comprised of a number of instruction counters for each queue, that enforces the dependencies between instructions in different queues.

20 Claims, 6 Drawing Sheets

| INSTRUCTION | DEPENDENCY QUEUE 1 | DEPENDENCY QUEUE 2 | DEPENDENCY QUEUE 3 |
|---|---|---|---|
| 120 | 122 | 124 | 126 |

OUT-OF-ORDER EXECUTION USING ENCODED DEPENDENCIES BETWEEN INSTRUCTIONS IN QUEUES TO DETERMINE STALL VALUES THAT CONTROL ISSURANCE OF INSTRUCTIONS FROM THE QUEUES

FIELD OF THE INVENTION

The invention relates to optimization techniques for exploiting instruction level parallelism in a computer and more specifically relates to an approach for executing program instructions out-of-order in a processor.

BACKGROUND OF THE INVENTION

An important design goal in the design of processors for computers is to increase the speed with which a processor executes a program. One way to achieve this goal is to execute more than one operation at the same time. This approach is generally referred to as parallelism, and sometimes, "Instruction level parallelism."

Some processors support parallelism by simultaneously issuing operations to independent functional units. The functional units can execute independent operations at the same time. Two types of processors with this capability are superscalar and Very Long Instruction Word (VLIW) machines. The term "Superscalar" usually refers to a machine that can issue multiple operations per clock cycle and includes special hardware to ensure that these operations are not dependent on each other. The term "VLIW" usually refers to machines that rely on the compiler to generate instructions having multiple operations that can be issued simultaneously. Both types of machines can issue multiple operations to independent functional units at the same time. The difference between the two is that the VLIW machine does not make any decision as to whether the operations in an instruction can be issued simultaneously, but instead, relies on the compiler to place independent operations in each instruction.

Another way to support parallelism is to use pipelining. Pipelining is a technique in which the execution of an operation is partitioned into a series of independent, sequential steps called pipeline segments. A typical pipeline might have the following stages: 1) fetch operation; 2) decode operation; 3) read all registers; 4) execute the operation; and 5) write the results to target registers. Pipelining is a form of instruction level parallelism because more than one operation can be processed in a pipeline at a given point in time. Note that even if a processor allows only one operation per instruction, it can still take advantage of parallel processing using a pipelined functional unit to process each instruction. Many modem computers use multiple, pipelined functional units, and therefore use both forms of parallelism outlined above.

An important restriction to parallelism is the interdependency between operations in the program. Generally, a first operation is dependent on a second operation if it uses the result of the first operation. When an operation is dependent on another, the processor cannot completely process the operation until the results of the operation on which depends are available. Conversely, if an operation is not dependent on another operation, or the dependencies of the operation are satisfied, then the processor can execute the operation, even if it is not executed in the precise order specified in the program. To maximize parallelism, software, hardware, or some combination of both can take a program and optimize it so that the processor's capacity to execute operations at the same time is utilized as much as possible. One way to maximize parallelism using software is to have the compiler analyze dependencies among operations and schedule operations such that independent operations are processed simultaneously. An example of this approach is a compiler for a VLIW machine that can place multiple operations in a single instruction. Processors can also include special hardware to dynamically check for dependencies and schedule operations to execute in parallel.

When the hardware dynamically schedules operations, it must ensure that dependencies between these operations are properly enforced. One way to enforce these dependencies is to use hardware called a "scoreboard" or interlock hardware. The scoreboard or interlock hardware allows the programmer to assume that all operations occur within a single cycle. However, since many operations take more than one cycle, the scoreboard or interlock hardware must detect the dependency of subsequent operations with the result of a previous, incomplete operation. Specifically, if an operation takes more than one cycle to complete and the subsequent operation is dependent upon the previous instruction, then the processing system must function to protect the dependency by stalling the issuance of the subsequent operation until the result of the previous, incomplete operation is obtained.

An example of a known scoreboard or interlock hardware approach is employed in the M32/100 microprocessor (Mitsubishi Electric Corporation). The M32/100 microprocessor has a five stage instruction execution pipeline and uses a hardware interlock mechanism with scoreboard registers to preserve the precedence of an instruction stream. More particularly, the M32/100 has multiple scoreboard registers which correspond to the pipeline stages. A bit is set in the scoreboard register which corresponds to the resource (register) receiving the result of the current instruction. The bit is shifted to the next stage scoreboard register synchronized with the flow of the instruction in the pipeline. When the execution of the instruction is completed, the bit is shifted out of the scoreboard registers. For example, if an instruction with a memory operand reaches the A-stage of the pipeline and tries to fetch the contents of a register or memory with a set scoreboard bit in at least one scoreboard register, the instruction pipeline stalls. The M32/100 microprocessor is more fully described in Yoshida et al., "A Strategy for Avoiding Pipeline Interlock Delays in a microprocessor," 1990 IEEE International Conference on Computer design: VLSI in Computers and Processors, Cambridge, Mass. (1990).

Another example of a scoreboard or interlock hardware approach uses tag and ready bit information with each register entry. The ready bit indicates whether the data in a register entry is valid, while the tag indicates the version of the register. Incorrect execution is prevented because operations whose operands are not ready are sent to a wait area until their operands are ready. As a result, instructions which are not ready do not necessarily stall the machine. This approach is more fully described in Uvieghara et al., "An Experimental Single-Chip Data Flow CPU," IEEE Journal of Solid-State Circuits, Vol. 27, No. 1, January 1992.

The special precautions (which prevent the issuance of subsequent dependent operation before the results of the previous, incomplete operations are obtained) can also be designed into the program. Namely, a class of machines exist which have user visible latencies which may coincide with actual hardware latencies. For these machines, programs can be written which guard against premature use of data by inserting a requisite number of operations between an operation and a use of its result. These inserted operation are placed in what is referred to as user visible delay slots. The number of user visible delay slots between an operation and use of its result depends on the latency. A processing system which executes a program having user visible delay slots need not use complex scoreboard or interlock hardware to determine if dependency exists.

User visible delay slots are programmed into code by a programmer or a compiler. The programmer or compiler uses detailed knowledge about resource availability and operation timing of the processing system (e.g., hardware latencies) to schedule the operations, inserting no-operations (NOOPs) when nothing else will work. Examples of user visible delay slots are memory load delay slots, branch delay slots and arithmetic delay slots. A load delay slot, for example, defines a number of cycles subsequent to a load operation during which the processing system cannot assume that the load has been completed.

An advantage of programming with user visible delay slots is that the processing system does not need the complex scoreboard or interlock hardware which is conventionally used to test the processor's registers for potential dependencies after the processor issues each operation. Scoreboard and interlock hardware is complex because it has to check for many dependencies at a high speed within each clock cycle. This special hardware is not only costly, but also tends to increase cycle time.

Although programs with user visible delay slots avoid the need for complex scoreboard or interlock hardware, such programs have a compatibility problem. A major disadvantage of programming with user visible delay slots is that the hardware latencies of the processing system must be known in order for the operations to be properly scheduled. As a result, a processing system which relies on user visible delay slots to prevent out-of-order execution will not be able to correctly execute programs created or compiled for a processing system having different hardware latencies.

Generally speaking, latency is defined as the number clock cycles between the time an input operand is ready for use by a hardware function and the time that a resultant operand from that function is ready for use by a subsequent hardware function. An assumed latency is the number of cycles which the programmer assumes a processor (which is to execute the program) needs to calculate the result of an operation. A hardware latency is the actual latency of the processor. A processing system typically has a number of processors which have fixed hardware latencies associated with each processor or fixed hardware latencies associated with each operation.

An operation is a command encoded in a processor instruction stream which describes an action which the processor is required to complete. An operation cannot issue until the availability of necessary input operands can be guaranteed. Typically, the necessary inputs and outputs are specified by register names. Furthermore, an instruction is a collection of one or more operations which are assumed by a programmer to be issued within a single cycle.

As technology develops, processors become faster and more powerful. As a result, hardware latencies are always changing. A program which is created or compiled with user visible delay slots for execution by a specific processor will likely not execute properly on processors having different latencies, even if the processors are from the same family of processors. Thus, programming with user visible delay slots is not effective when the latencies of a processing system which executes the program differ from the latencies which were fixed in the program when created or compiled. Accordingly, the conventional uses of user visible delay slots fail to provide compatibility with processing systems having hardware latencies differing from those assumed in the program.

In any case, it is not commercially feasible to recompile a program every time a next generation processor, of a family of processors, is developed. For a number of reasons, vendors and users of programs want as few versions of a program as possible. One major reason is that every new recompile would have to be completely retested which would be not only very time consuming but also expensive. Another reason is that vendors do not want to inventory and support many different versions of a program.

Table 1 illustrates a portion of a program which utilizes user visible delay slots which assume a fixed latency in a conventional manner. Assume that the program shown in Table 1 is compiled for a first type of processor having a hardware latency of three cycles for the operation op2. When compiling source code or writing assembly language programs, delay slot(s) are preferably filled with meaningful operations which could not possibly be dependent on the result of the previous operation. However, if no such operation is available, then a no-operation (NOOP) may be placed in the delay slot. In the example shown in Table 1, two delay slots were coded in the program between operation op2 and the user of its result (i.e., operation op3). The notations ra, rb, rc, rd and re refer to registers in the processing system.

Also assume that subsequent to the program being compiled for the first type of processor, a second type of processor is developed having a hardware latency of four cycles for the operation op2. Although the program executes properly on the first processor, the program will likely not operate correctly on the second processor. In particular, when the second processor begins execution of operation op2 in cycle (0), the result cannot be guaranteed to be returned into register rc until cycle (4). However, in cycle (3), the subsequent operation op3, which is dependent on the value in register rc, begins execution. Accordingly, executing the program with the second processor would yield an incorrect result. As a result, programs using user visible delay slots and compiled for a specific processor cannot be guaranteed to execute properly on earlier or later processor generations.

TABLE 1

| CYCLE | |
|---|---|
| (0) | rc = op2(ra,rb) |
| (1) | op |
| (2) | op |
| (3) | re = op3(rc,rd) |
| (4) | |

One way to avoid this problem is to have the code generator (e.g., compiler) explicitly encode the dependency distance with each instruction. The technique is utilized in the experimental Horizon supercomputing system which has a shared-memory Multiple Instruction stream-Multiple Data (MIMD) stream computer architecture. The instruction set of the Horizon supercomputing system includes a lookahead field with every instruction. The lookahead field contains a value which is used to control instruction overlap. This value is guaranteed by the code generator to be less than or equal to the minimum distance to the next instruction that depends on the current instruction. That is, the value in the lookahead field indicates the number of additional instructions that may be issued before the current instruction is completed. For example, if the hardware latencies vary from one to eight cycles, then a three (3) bit lookahead field would be added to every instruction.

A disadvantage of the Horizon supercomputing system is that the value in the lookahead field applies to all three operations within the instruction, thereby forcing the value in the lookahead field to the worst case (smallest) value within the instruction. The experimental Horizon supercomputing system is more fully described in Kuehn and Smith, "The Horizon Supercomputing: Architecture and Software," Supercomputing '88 (IEEE), November 1988; Draper, "Compiling on Horizon," supercomputing '88 (IEEE), November 1988; and Thistle and Smith, "A processor Architecture for Horizon," Supercomputing '88 (IEEE), November 1988.

Another approach is to allow the compiler to make latency assumptions to optimize a program and then communicate these assumptions to the processor. A supercomputer, referred to as the Cydra™ 5 supercomputer, is a heterogenous multiprocessor system having a single numeric processor and one to six interactive processors sharing a common virtual memory system. The supercomputer has a directed dataflow architecture which requires that the latency of every operation be known. The programmer uses a "virtual time" memory latency assumption which perceives each memory request as taking the same amount of time. However, in reality the data may be ready sooner or later than expected. If the access time expected by the compiler is consistently less than the actual access time, the processor spends a significant fraction of its time in a frozen or stalled state. If the expected access time is consistently greater than the actual access time, the length of the schedules generated at a compile-time are unnecessarily dilated.

The Cydra™ 5 adjusts its nominal memory access time using a programmable memory latency register which contains the assumed memory latency value that the compiler used when scheduling the currently executing code. The memory system uses the value in the memory latency register to decide whether the data from memory is early or late and, consequently, whether the data should be buffered or the processor stalled. If the result is tardy, the processor will stall execution of the subsequent instruction until the result is ready. The memory latency register is used to provide flexibility in a machine when the value or best value of memory latency is unknown.

One limitation of this approach is that it improves performance only with respect to memory access. Another limitation is that if the memory latency register is changed to a larger value while there are some outstanding memory requests, the Cydra™ 5 may no longer execute properly. The Cydra™ 5 supercomputer is more fully described in Rau et al., "The Cydra™ 5 Stride-insensitive Memory system," 1989 International Conference on Parallel Processing, 1989.

While these optimizations in code generation techniques can improve performance using simpler dependency checking hardware than register scoreboards or interlock mechanisms, they tend to cause compatibility problems and can even produce incorrect results.

SUMMARY OF THE INVENTION

The invention provides a method and related hardware for supporting out-of-order execution of instructions to exploit instruction level parallelism and improve the performance of a computer.

In one implementation of the invention, a compiler sorts the instructions in a program into separate instruction queues. Preferably, the compiler places the instructions in these queues based on functionality or known interdependence. For example, one approach is to use separate queues for memory, integer and floating point instructions. Another approach is to use separate queues for each thread in a computer operating environment that allows multiple threads of execution. In addition to sorting instructions among these queues, the compiler also encodes instruction dependency along with each instruction. This dependency information describes the dependency between an instruction in one queue and interdependent instructions in other queues. Optionally, the dependency information can also explicitly encode the dependency between the instruction and an interdependent instruction in the same queue.

During execution of the program, the processor issues instructions from each queue in sequential order. However, an instruction in one queue may be issued out-of-order from an instruction in another queue. In this context, out-of-order means that the processor issues an instruction out-of-order from the order of these instructions in the un-compiled program. The processor reads an instruction's dependency information and enforces this dependency when issuing instructions from each queue. An instruction issue unit issues instructions independently from each queue, and as it does so, it makes sure that the encoded dependencies are satisfied. In sum, the processor can issue instructions from each queue independently and as fast as the functional unit can handle new instructions, as long as the dependencies are satisfied.

This approach has a number of advantages. In contrast to processors that make register to register comparisons to check for dependencies, this approach uses the encoded dependency provided by the compiler and therefore, can use much simpler dependency checking hardware. The hardware used to enforce the encoded dependency is easier to implement, is less expensive in terms of hardware, and is less likely to reduce cycle time than complex register scoreboard or interlock hardware.

Relative to VLIW machines where instructions contain functionally different operations, this approach does not require the compiler to fit different operations into a single instruction word. Compilers for VLIW machines are not always able to find independent operations to put in each instruction, and as a result, the parallel processing capability of the processor is not fully utilized. The instruction queues do not have this limitation, and therefore, the operations are more compact in their respective queues. The fetching and issuing of operations from the queues is more efficient relative to VLIW machines because there are no wasted cycles fetching instructions with fewer than the maximum number of operations per instruction. In addition, the instruction issue unit issues operations independently from each queue. Thus, the processor does not have the limitation of issuing a single, multi-operation instruction per clock cycle.

Another advantage of the approach summarized above is that it "decouples" the specific hardware design of the functional units in the processor from the compiler. Without modifying the instructions, the hardware design can be changed to add or remove functional units. Since instructions can be queued and issued independently by function, the compiler does not have to be changed when the hardware implementation is changed to add or remove functional units associated with a queue or a particular instruction type (e.g., adding another functional unit for executing integer operations). The number of functional units for each queue affects overall performance but does not necessarily change the manner in which the compiler separates the instructions into queues by their function. In some VLIW processors, the compiler is tightly coupled with the hardware design of the functional units because the compiler has to schedule instructions based on the specific number of functional units available for different functional types of instructions, such as memory, integer and floating point instructions. There is no such restriction in a processor that issues instructions independently from queues because the compiler only has to sort the instructions by function and the processor can then decide how to issue the instructions to their respective functional units.

An additional advantage is that instruction queues can improve the design of the processor chip because they can be located near their respective functional units on the chip. As processors become more complex, chip delays can increase due to the length of interconnects extending between related hardware logic. One reason for increasing chip delays is that instructions enter at one location and then are issued to separate functional units across the chip. Instruction queues can minimize this problem because instructions are issued independently from their respective queues to functional units located nearby.

These and other features and advantages of the invention are described in detail below in the following detailed description and accompanying drawings.

DETAILED DESCRIPTION

Figure 1:
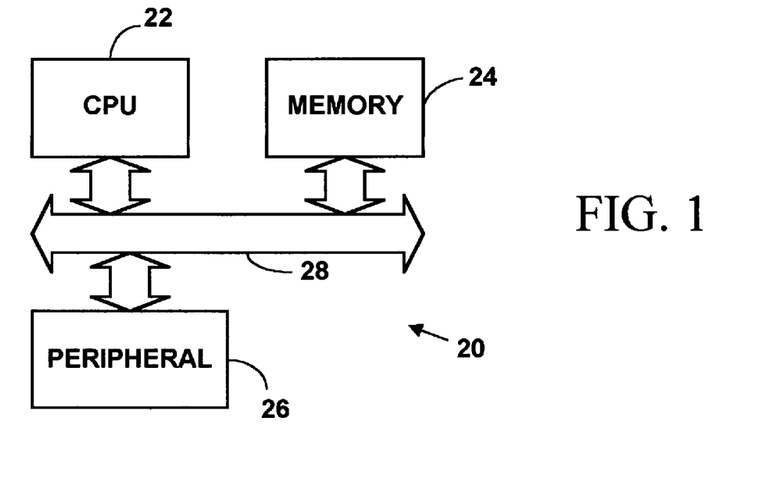
FIG. 1 illustrates a generalized block diagram of a computer system in which the invention may be implemented.

As an overview, FIG. 1 illustrates a generalized block diagram of a computer system 20 in which the invention may be implemented. The computer system 20 includes a CPU 22 coupled to memory 24 and one or more peripheral devices 26 via a system bus 28. The system bus 28 carries data and control signals to the CPU 22, memory 24 and peripheral devices 26. The memory 24 preferably includes Random Access Memory (RAM), but may also be implemented with Read Only Memory (ROM), or a combination of RAM and ROM. The memory 24 stores data for one or more programs that may be executed in the computer system 20.

In an alternative embodiment, a crossbar interconnect is used in lieu of system bus 28. Herein, whenever a bus is referred to a crossbar interconnect may be substituted for the bus.

Figure 2:
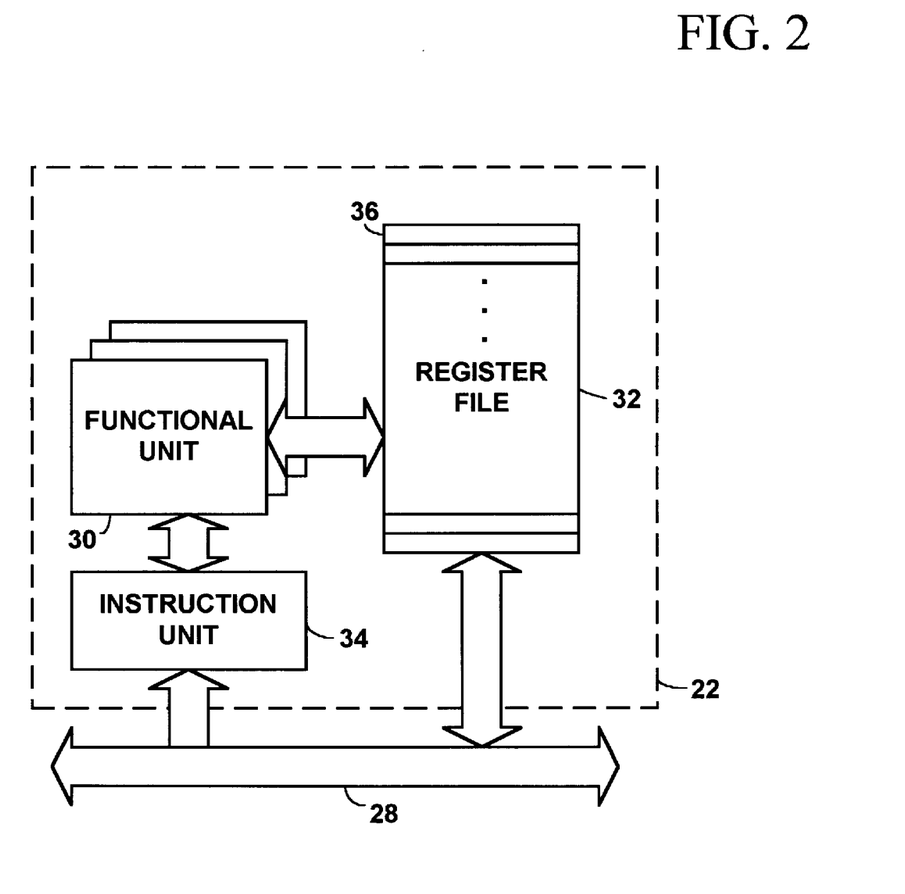
FIG. 2 is a general block diagram of a processor in an implementation of the invention.

FIG. 2 is a general block diagram of a processor (Central Processing Unit, CPU) 22 in an embodiment of the invention. The processor 22 includes multiple functional units 30, one or more register files 32, and an instruction unit 34. The register files 32 typically contain several general purpose registers 36 for storing values, addresses and possibly other data. The term "general purpose registers" can include floating point, fixed point, and predicate registers, to name a few.

The architecture of the processor 22 may vary. This particular architecture merely depicts the high level hardware design of a processor 22 in one possible embodiment. The method for out-of-order execution described here can provide performance improvement in a variety of CPU designs, including in particular, CPUs with multiple functional units or CPUs with multiple pipelined functional units.

In the process of running a program, the CPU 22 carries out a series of instructions stored in memory 24. The instruction unit 34 fetches an instruction from memory via the system bus 28 and then decodes the instruction. Depending on the type of CPU and/or the scheduling method used, an instruction may have more than one operation. The instruction unit 34 issues operations to a functional unit 30 or to multiple functional units (shown as stacked boxes in FIG. 2). The instruction unit 34 sends control signals to a functional unit 30 to carry out the operation or operations in an instruction. In response to these control signals, the functional unit 30 reads data such as address or value from the appropriate registers in the register file 32 and performs an operation. For some operations, the functional unit 30 writes a result back to the register file 32 (e.g., register 36 in the register file 32). For a memory store operation, the functional unit 30 reads a memory address and a value stored in the register file 32 and transfers the value directly to memory 24.

Figure 3:
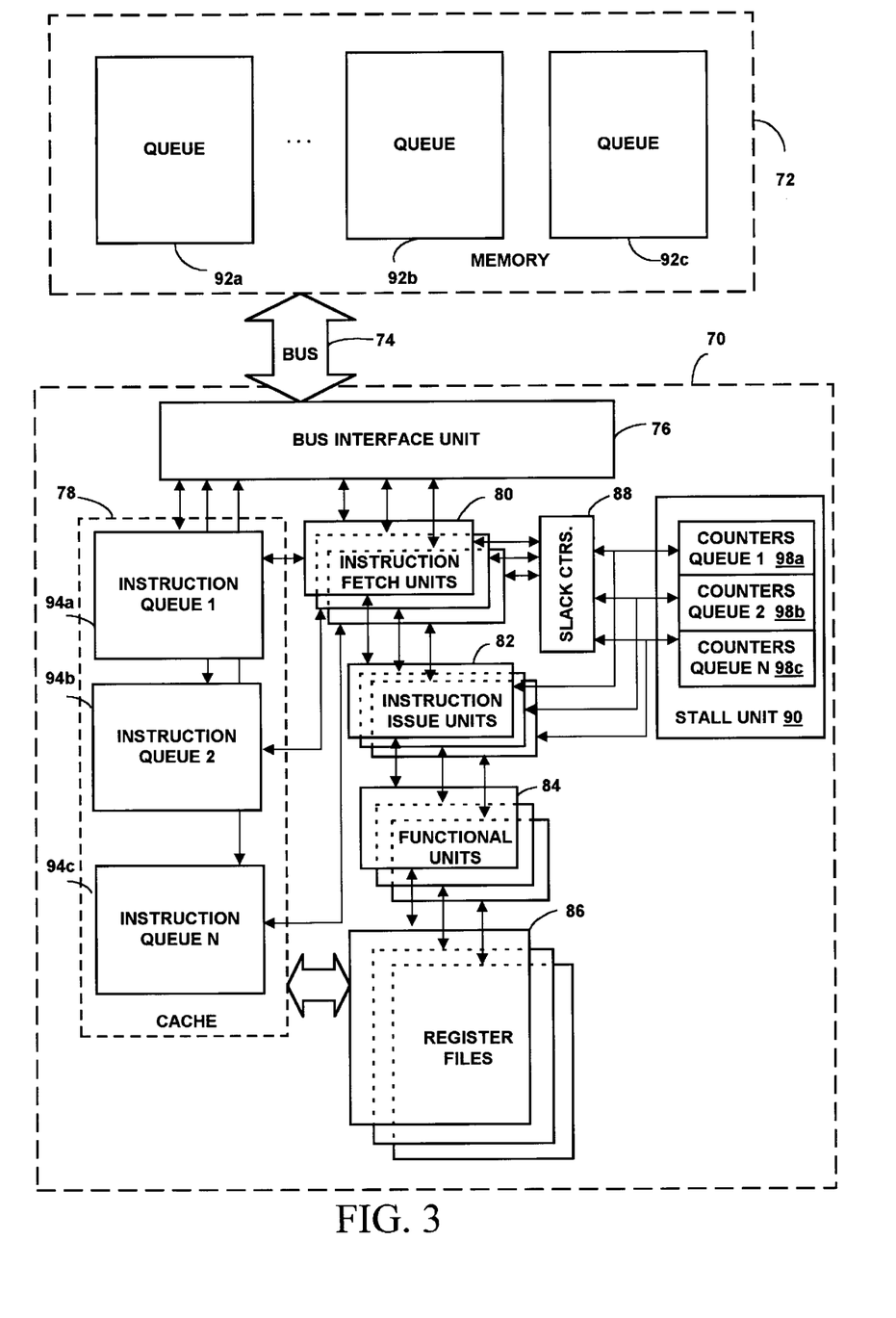
FIG. 3 is a block diagram showing the relationship between the computer's memory and the processor in an implementation of the invention.

FIG. 3 is a block diagram showing the relationship between the computer's memory and the processor. In this implementation, the processor 70 interfaces with main memory 72 of the computer through the local bus 74. The processor includes a bus interface unit 76, a cache 78, instruction fetch units 80, instruction issue units 82, functional units 84, and register files 86. The processor 70 also includes slack counters 88 and a stall unit 90 that prevent the instruction issue units 82 from issuing an instruction when it is necessary to enforce a dependency between instructions. Specifically, the stall unit 90 issues a stall signal preventing one of the instruction issue units 82 from issuing the next instruction from an related queue when the result from another instruction in the same or another queue is needed to execute the next instruction.

The diagram of the memory 72 shows a number of instruction queues 92a–c. These queues represent sections of memory where the compiler has placed functionally related instructions. In this implementation, the queues correspond to sections in the linear memory space of the computer's main memory. The compiler takes a program as input and compiles functionally related instructions into separate queues. This diagram illustrates three separate queues for memory 92a, integer 92b and floating point 92c operations. The actual number of queues is not critical to the invention, and varies depending on the implementation of the processor. The instructions can also be sorted based on known interdependence such as by sorting the instructions in threads into separate queues.

The bus interface unit 76 serves as an interface between the processor 70 and the local bus 74 to the computer's main memory. It controls the transfer of instructions and data to and from memory 72. It can be implemented using any of a variety of conventional bus control logic used in computers.

The cache 78 is a memory unit in the processor 70 for temporarily storing instructions and data. While shown as one unit here, the cache can be implemented as two separate units for instructions and data or as a single unit that caches both instructions and data. The cache can be implemented as separate units that are each physically located in proximity to an instruction fetch unit 80, an instruction issue unit 82, and the functional unit or units 84 for a particular type of instruction. For example, the cache, instruction fetch, instruction issue, and functional units for integer instructions can be located in proximity to each other on the processor chip 70. Allocating chip space in this manner can reduce chip delay because it allows related units to be located in close proximity to each other, reducing the length of interconnects on the processor chip.

In FIG. 3, the portion of the cache 78 used to store instructions includes separate sections corresponding to the instruction queues. For convenience, we refer to these sections as cache instruction queues or cache queues 94a, 94b, 94c. The cache includes cache logic that keeps each cache queue filled with instructions from the corresponding instruction queues 92a–c in memory. The cache logic operates in conjunction with the bus interface unit 76 and the corresponding instruction fetch unit 80 to keep the instruction queue (e.g., 94a) filled with instructions.

The instruction fetch units 80 are responsible for fetching instructions from the cache queues and then decoding the instruction including the dependency data provided with the instruction. In this particular implementation, each instruction includes a single operation and encoded dependency data. However, it is also possible to implement an instruction with more than one operation—for example, by placing three operations of the same functional type in a single instruction.

The instruction fetch units 80 use the dependency data, the known latency of the instruction and the relative displacement or "slip" between the instruction queues to ensure that the dependency between instructions is enforced. FIG. 2 shows three fetch units 80 to reflect that each instruction queue can have a corresponding instruction fetch unit to enable the processor 70 to fetch and issue instructions from each of the queues independently. The instruction fetch units 80 fetch instructions from the cache queues 94a–c independently and decode the dependency data. Using the dependency data, the instruction fetch units set control logic in the slack counters 88 and stall unit 90 to enforce dependencies between instructions in the same and different queues. "Enforcing dependencies" refers to the process of ensuring that interdependent instructions are issued in the proper order (i.e. not issued until the results they need from another instruction, possibly from another queue, are available). As explained farther below, the approach used to enforce dependencies depends, in part, on whether or not the processor is implemented such that instructions have unit latency.

The dependency information identifies a dependent instruction by giving its location in a queue relative to another instruction in the same or different queue. The "known" latency is the latency of the instruction, which is "known" in the sense that the hardware implementation of the processor is programmed or hard-wired to be aware of the latency of the different types of instructions that it executes based on their type (e.g., if it is an integer instruction, then it has a latency of 5 cycles). The relative displacement of the queues (also referred to as "slip" or "slack") refers to the extent to which one queue gets ahead or behind another queue in issuing instructions. Some slip will typically occur because the processor with instruction queues issues instructions from each queue independently.

The dependency information ensures that the processor executes inter-dependent instructions from different queues in the proper order. This is significant because the instruction issue units 82 can issue instructions from each queue independently, except for the restriction that inter-dependent instructions must be executed in the proper order. A processor designed to take advantage of the invention can be implemented such that the instructions have "unit latency" or "non-unit latency." Unit latency means that the processor does not issue the next instruction from a queue until the processor has finished executing the immediate, previous instruction from the same queue. In the unit latency case, the processor uses the displacement distance and relative displacement between queues to enforce dependencies. "Non-unit latency" means that the processor can issue one or more subsequent instructions from a queue before it finishes executing a previous instruction in the queue. In the case of non-unit latency, the processor uses the known latency of an instruction, the displacement distance, and the relative displacement between queues to enforce dependencies between instructions in different queues (and possibly the same queues as well). The processor can enforce dependencies between instructions in the same queue using a technique similar to the approach described in co-pending U.S. patent application Ser. No. 08/059,041 by Michael S. Schlansker et. al., filed on May 6, 1993, and entitled "METHOD AND APPARATUS FOR SIMPLIFYING INTERLOCK HARDWARE," which is hereby incorporated by reference. In a processor supporting instruction queues, the method for enforcing dependencies for out-of-order execution has to be extended to cover the case of inter-dependencies between instructions in different queues.

The dependency data encoded with instructions can be in the form of a displacement distance that describes the location of inter-dependent instructions. There are two main types of displacement distances:

1) Generator-to-user dependency-the distance from an instruction that generates a result to instructions that use this result (i.e., from a generator instruction to a user instruction); or 2) User-to-generator dependency-from the operand(s) of an instruction (an instruction that uses a result or "user instruction") to the instructions that generate the operand(s) (i.e., from the user instruction to the generator instruction(s)).

The displacement distance identifies the location of the user instructions relative to the generator instruction, in the first case, and identifies the location of the generator instructions relative to the user instruction in the second case. The displacement distance for generator-to-user dependency is encoded with the generator instruction, while the displacement distance for user-to-generator dependency is encoded with the user instruction.

In the unit latency case, the processor 70 controls interdependencies between instructions of different queues using slack counters (e.g., slack counters 88 in FIG. 3) to keep track of the relative slip between instructions in different queues. The relative displacement or "slip" between two queues is the difference between the number of instructions issued in the two queues relative to a common reference time where the slack is zero (e.g., all slack counters are set to zero when the processor begins executing a program). In other words, the "slack" or "slip" is how far ahead or behind one queue is relative to another queue in issuing instructions. At any point in time, the processor may have issued more instructions from a particular queue than another because it had to stall the issuance of an instruction from one queue to wait for a result of an instruction of another queue.

For the case of unit latency, the processor only has to stall the issuance of a user instruction if the instructions on which it depends have not issued before it. The processor can determine whether to stall an instruction by comparing the user-to-generator displacement distance for each of the other queues with the value of each of the slack counters that represents the slip between the queue in which the user instruction resides and the queue in which one of the generator instructions reside. If the values of each of these slack counters 88 indicate that the user instruction will be issued later than the generator instruction, then the processor can issue the instruction. If not, the stall unit has to stall the issuance of a user instruction until the slack counter indicates that the generator instruction has issued.

For example, consider an implementation where the displacement distances are encoded such that they represent the number of instructions that the user instruction is after the generator instruction, and there is a slack counter counting how many instructions the user instruction's queue is ahead of the generator instruction's queue. In this implementation, the stall unit 90 does not have to stall as long as the displacement distance (decoded from the user instruction) is greater than the slack counter value of the counter that measures relative displacement between the generator and user instructions' queues. In other words, if the user instruction's queue gets ahead of the generator instruction's queue by enough instructions, then it may have to wait for the generator instruction to issue. Of course, there are many possible variations to this approach depending on how the dependency distance is measured by the compiler and encoded, and how the slack counters 88 measure the slip between queues.

One way to implement the slack counters 88 is to use a slack counter to keep track of the relative slip between each unique pairs of queues (e.g., if there are three queues, the processor can be implemented with three slack counters— one each for the slack between queue 1 and queue 2, queue 2 and queue 3, and queue 1 and queue 3). It is also possible to use fewer slack counter if one slack counter serves as a baseline or reference to the other slack counters. Specifically, for n queues, one could implement the processor with n−1 slack counters where one of the slack counters is used as a reference to the other slack counters. In either case, the slack counters 88 are implemented as counters that keep track of the relative slip between two queues.

For the case of unit latency, the stall unit 90 determines whether and how much to stall an instruction based on the encoded dependency distance and slack counter values. It also provides "update slip" signals back to the slack counters 88 to update the value of the slack counters when a stall in issuing an instruction from a first queue changes the relative slip between the first queue and another queue.

For the case of non-unit latency, the processor uses the known latency of an instruction, the encoded displacement distance, and the relative displacement between queues to enforce dependencies between instructions in different queues. Like the unit latency case, the processor needs to ensure that it does not issue a user instruction until the result or results of its generator instruction(s) are available. However, the processor also has to take into account the latency of the generator instruction, since it is not assumed that each instruction in a queue is issued only after the immediate, previous instruction in the queue is complete. Since the processor is aware of the generator instruction's type, it also knows the latency of the generator instruction. The encoded dependency distance gives the relative position of the interdependent instructions in different queues (user-to-generator, or generator to user), and the value of the slack counter gives a slip value indicating how the relative displacement between queues has changed during execution of the program. With these values, the processor can compute the number of stall cycles needed to enforce the dependency between instructions in the same and different queues.

For example, if instruction I1 in queue 1 generates a result used by instruction I2 in queue 2 and the displacement distance of I1 to I2 is three (the compiler initially schedules I2 to issue 3 instructions later than I1), then the encoded dependency distance is 3. Assuming that the latency of I1 is 5 and instructions are issued every cycle of the processor, then the processor knows that it has to stall I2 by two cycles to enforce the dependency between I1 and I2. Now, assuming that the slip between queue 1 and 2 is such that queue 2 is 2 instructions ahead of queue 1, then the actual displacement distance at the time when the slip is checked is 1 instruction because I2 started out three instructions behind and now is only 1 instruction behind. Thus, instruction I2 would now have to be stalled by 4 cycles to enforce the dependency between I1 and I2. Assuming no changes in the relative displacement from the time the stall unit 90 checks the slip, I1 will issue one cycle ahead of I2 (using up one cycle of latency of I1) and I2 will then stall 4 cycles before issuing to use up the 4 remaining cycles of latency.

To address the case of non-unit latency, the stall unit in FIG. 3 processor 70 in FIG. 3 has multiple instruction counters per queue, each corresponding to an instruction in the queue. Each instruction counter keeps track of the specific number of stall cycles required before the instruction issue unit 82 can issue the corresponding instruction. The stall unit 90 computes the number of stall cycles based on the encoded dependency distance, the slip value from the appropriate slack counter, and the known latency. For instance, in the example above, the stall unit would compute that the number of stall cycles is 4 and would set the value of the instruction counter for the user instruction I2 to a stall value of 4.

The preferred way to implement the stall unit 90 is to postpone stalls until the last cycle (the cycle when the instruction issue unit 82 is just about to issue the user instruction). This is the preferred way because it amortizes and combines multiple stalls, avoiding unnecessary stalls until they are required to prevent the user instruction from issuing before the results of the generator instruction(s) are available. At every stall that occurs before the instruction issue unit issues a user instruction, the instruction counter for the user instruction is decremented. In fact, in the preferred implementation, the stall unit 90 decrements each of the instruction counters 98a–98c at every stall. In the example above where the stall value is initially set to 4, the stall unit 90 will decrement the value of the instruction counter with each stall that occurs before the instruction issue unit reaches instruction I2. Once it reaches I2, the instruction issue unit checks the instruction counter via a stall signal from the stall unit 90. If the value of the instruction counter for I2 is zero, the instruction issue unit will issue instruction I2. For instance, if four stalls occur between the time when the stall unit sets the number of stall cycles for the I2's instruction counter and the time when the instruction issue unit reaches I2, then the instruction issue unit will not need to stall the issuance of an instruction. If there are any remaining stall cycles left for I2, the instruction issue unit will stall the issuance of I2 until the counter is back to zero. This approach avoids unnecessary stalls by using stalls for previous instructions to consume the stalls of later instructions.

Since the number of instruction counters per queue is typically much less than the number of instructions in a given queue, the stall unit 90 re-uses the instruction counters. Specifically, it rotates through the instruction counters such that if there are n counters per queue and each of the n counters correspond to one instruction each of a set of n instructions in the queue, then instruction counter 1 counts the number of stall cycles before instruction number n+1 after the instruction issue unit issues instruction 2. Each of the instruction counters 98a–c count the number of stall cycles before a corresponding instruction. After the instruction issue unit 82 has finished using an instruction counter, this instruction counter is used for the instruction that is n instructions before the instruction that it was just associated with in the queue.

A user instruction can be dependent on more than one generator instruction. Thus, when setting the instruction counter for the user instruction, the stall unit 90 compares the existing value of the instruction counter with the new instruction value computed based on a second (or other) generator instruction and only updates the stall value if the new value is greater than the existing value. Thus, in the case where a user instruction is dependent on more than one generator instruction, the stall unit sets the instruction counter of the user instruction to the larger of the stall values computed for each of the generator instructions.

In the case where the instructions encode the user-to-generator dependencies, for example, the stall unit 90 will compare the computed stall values for generator instructions from different queues and select the largest value. For instance, assume a user instruction in queue 1 is displaced:

1) a distance of 5 instructions after a first generator instruction in queue 2 (scheduled to issue 5 instructions later than the generator instruction); and 2) a distance of 3 instructions after a second generator instruction in queue 3 (scheduled to issue 3 instructions later than the generator instruction.

Further assume that the latency of instructions in queue 2 and 3 is five, the stall unit will compute a stall value of zero for queue 2 and a stall value of 2 for queue 3. The stall unit will then set the instruction counter for the user instruction to the larger of the stall values. Note that if there are more than one generator instructions in the same queue for a user instruction, the compiler can be programmed to only encode the user-to-generator displacement distance that is most critical (i.e., that causes the most latency and will potentially lead to the greater number of stalls of the user instruction). This is sometimes referred to as the "worst case" latency.

The process of setting the stall values is slightly different when the instructions encode generator-to-user displacement. Subsequent instructions in a queue sometimes generate results used by the same user instruction. In other words, the user instruction is dependent upon more than one generator instruction. In these circumstances, the stall unit will compute the stall value of the user instruction for these generator instructions as they are decoded. Then, as the instruction fetch unit decodes the generator instructions, the stall unit 90 will update the stall value of the instruction counter for the user instruction at the time the later generator instruction is decoded if the new stall value is larger than the existing stall value in the instruction counter. The existing stall value is the stall value computed for an earlier dependent generator instruction, less any stall cycles that occurred between computing the new stall value and the previous stall value for the earlier generator instruction.

Each of the instruction issue units 82 issue instructions from a corresponding queue sequentially to a functional unit 84 associated with the instruction type of the queue. The instruction issue units 82 receive the next instruction for a particular queue from the corresponding instruction fetch unit 80 and check the stall signal for the instruction from the stall unit 90. As explained above, the instruction issue units 82 operate under the control of a stall signal from the stall unit 90. This stall signal is computed differently in the unit latency and non-latency cases, but the impact on the issuance of an instruction is the same. The instruction issue unit 82 stalls the issuance of an instruction as long as it receives a stall signal from the stall unit 90 for next instruction in the queue.

When the instruction issue unit 82 stalls the issuance of an instruction, it sends a signal back to the slack counters 88. The slack counters determine whether the stall changes the relative displacement between queues and adjust the values of the individual slack counters for which the "slip" has changed.

The processor 70 in FIG. 3 has a separate instruction issue unit 80 for each type of instruction, and each one issues instructions independently to the appropriate functional unit 84. The processor includes at least one functional unit for each type of instruction. This particular implementation has three functional units corresponding to memory, integer and floating point instructions. However, the precise number and implementation of the functional units is not critical to the invention. One benefit of the invention, as explained above, is that instructions can be compiled into queues based on their function type without regard to the number of functional units available to process each type of instruction. To improve performance, additional functional units can be added for one type of instruction or for each type of instruction. As long as the instruction issue unit makes sure that the dependencies between instructions in different queues are satisfied, each instruction unit can issue instructions to a corresponding functional unit as fast as the functional units are capable of executing new instructions. Thus, the ability to issue instructions independently from separate queues enables the processor to take better advantage of the processing resource of the functional units.

The functional units 84 are responsible for executing instructions issued to them by the instruction issue units 82. In this particular implementation, there are functional units for memory, integer and floating point operations. Each functional unit processes instructions in a pipeline fashion.

Each functional unit decodes an instruction, reads the appropriate source registers in the register files 86, and then writes the results to the target registers 86.

The processor includes register files 86 corresponding to the functional units 82. The functional units 84 utilize the data cache to reduce the latency of memory operations. The register files 86 communicate data to and from memory via the data cache implemented within the cache 78.

The method for enforcing dependencies between instructions in different queues differs depending on whether:

1) the processor implements a unit or non-unit latency scheme; and 2) the compiler encodes generator-to-user or user-to-generator displacement with each instruction.

Unit Latency

For the case of unit latency, the instructions in the implementation described above encode user-to-generate displacement. The stall unit 90 computes the stall value for the user instruction based on the difference between the encoded displacement distance and the slip value between the queue of the user instruction and the queue of the generator instruction.

Figure 4:
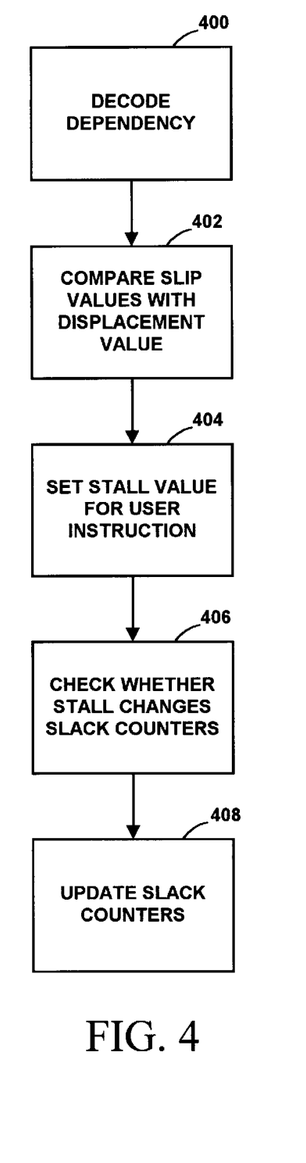
FIG. 4 is a flow diagram illustrating a method for enforcing dependencies between instructions in different queues where instructions have unit latency.

FIG. 4 is a flow diagram illustrating a method for enforcing dependencies between queues in the case of unit latency. In the illustrated method, the user-to-generator displacement is encoded with the user instruction. The process begins by fetching and decoding the next instruction in the queue. In step 400, the instruction fetch unit 80 decodes the displacement distances encoded with the instruction. It decodes the dependency fields of each instruction after fetching it from the instruction cache queue (e.g., 94*a*) corresponding to the instruction fetch unit 80.

The instruction fetch unit 80 communicates the displacement values of the current user instruction to the stall unit 90. The stall unit 90 then accesses the slack counters 88 to determine the slip between the queue that the instruction came from and each queue that has a dependent generator instruction. The stall unit 90 compares the slip values from the slack counters with the encoded displacement values to determine a stall value as shown in step 404. Next, the stall unit 90 sets the stall value for the current user instruction being processed. This stall value can be in the form of the number of cycles needed to stall the current user instruction. In this case, a counter can be used to keep track of the number of stall cycles left before the next instruction can be issued. The stall value can also be in the form of a control signal generated by repetitively monitoring the slack counters to determine when the dependent generator instructions from other queues have been issued by comparing the encoded displacement value for each generator instruction with the slip value of the counter for each queue holding a dependent generator instruction. The stall unit 90 asserts a stall signal as long as necessary to ensure that the dependent generator instruction or instructions have issued. Of course, if no stalling is necessary, the stall value is zero meaning that no stall cycles are needed to enforce a dependency and no stall signal needs to be asserted to the instruction issue unit 82.

If the stall unit issues a stall signal, the stalling of one queue could change the slack counters that measure the slip between this queue and other queues. As shown in step 406, the stall unit 90 checks whether the current stall value changes the value of the related slack counters. The stall unit 90 updates the appropriate slack counters if it issues a stall signal for one queue and not another queue such that the displacement between the queues changes.

The method shown in FIG. 4 repeats for each user instruction fetched from each queue. The steps in this method can be implemented in a pipeline fashion including stages such as: 1) fetch next user instruction, 2) decode instruction including its displacement fields representing dependency between instructions in different queues, 3) compute stall value, and 4) stall or issue the user instruction for execution. The last two steps 406, 408 can be performed with each stall cycle occurring during stage 4.

Non-Unit Latency

For the case of non-unit latency, there are different implementations of the slack counters 88 and stall unit 90 based on whether the instructions encode generator-to-user or user-to-generator displacement.

User-to-Generator Dependency (Non-unit latency)

For user-to-generator displacement, each instruction has a displacement field for each of the queues, and each field encodes the most critical displacement for a generator instruction in the respective queues. This form of encoded dependency uses a separate field to encode the displacement distance from the user instruction to the most critical generator instruction in each of the queues. "Most critical generator instruction" refers to the generator instruction in the queue that is initially scheduled to issue the latest. It is most critical because this is the last generator instruction in this particular queue that the user instruction will have to wait for before it can issue. The user instruction will potentially have the largest stall value for the last dependent generator instruction to issue from this particular queue.

The number of fields with each instruction is equal to the number of queues. It is possible to avoid using a field for the user instruction's own queue in cases where subsequent instructions in a queue will not use the result of a previous instruction until the result is available.

Figure 5:
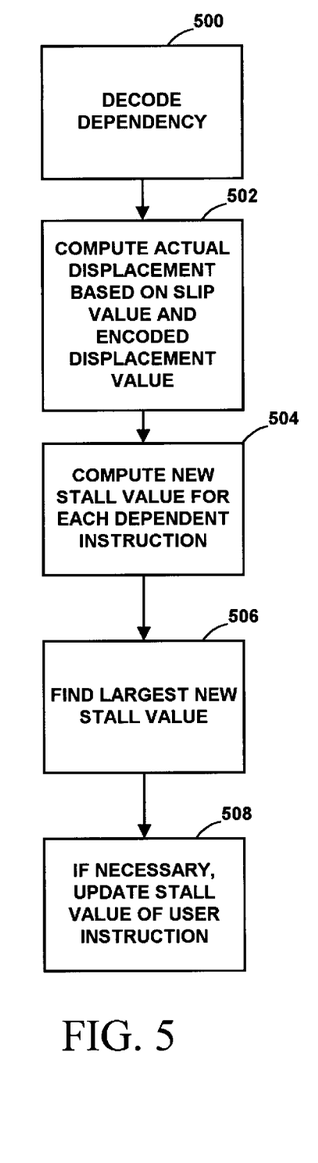
FIG. 5 is a flow diagram illustrating a method for enforcing dependencies between instructions in different queues where instructions have non-unit latency.

FIG. 5 illustrates a method for enforcing the dependencies between instructions in the same and different queues. As shown, the first step is to decode the dependency data encoded with the current instruction fetched from the instruction cache queue. In this particular example, the user-to-generator displacement is encoded with the user instruction.

After the instruction fetch unit 80 decodes an instruction, it first computes the actual displacement distance to the most critical generator instructions in each of the queues based on the encoded displacement distance as shown in step 502. For the dependent generator instructions in different queues, the actual displacement of the generator instruction depends on the displacement distance and the relative slip between the queue of the user instruction and the queue of the dependent generator instruction. For example, if the encoded displacement is 3 to a generator instruction in queue 2 (assuming the user instruction is in queue 1 and the generator instruction is 3 instructions behind it in queue 2) and the relative slip is 2 (queue 2 has fallen behind by 2 instructions), then the actual displacement at this time is 5.

The next step 504 is to compute the new stall value or values for the user instruction's instruction counter. Assume in this example that the latency of the generator instruction is 5 cycles. Since the actual displacement is 5 and the processor issues instructions every cycle (absent stalls), then the new stall value is 10. Since the generator instruction is now five cycles behind, and the latency of the generator instruction is 5, the total number of cycles that the user must be stalled is 10: 5 cycles to wait for the generator to issue and 5 cycles to wait for the result to be available, once the generator has issued.

The next step 506 is to compare the new stall value computed for each of the queues. Note that the user instruction is potentially encoded with dependency data for generator instructions from each of the queues, and thus, there may be new (and different) stall values computed for each of these queues. The largest new stall value out of these new stall values is the "final" new stall value.

If necessary, the stall unit 90 updates the stall value of the user instruction as shown in step 508. If the final new stall value is less than or equal to the existing stall value, the stall unit does not update the instruction counter. Otherwise, the stall unit changes the stall value to the larger of the new and existing stall values. The example above only considered a dependent generator instruction of one other queue. If the implementation includes additional queues, the stall unit would compute the new stall value based on each dependent generator instruction and use the largest new stall value to determine whether to update the instruction counter.

Figure 6:
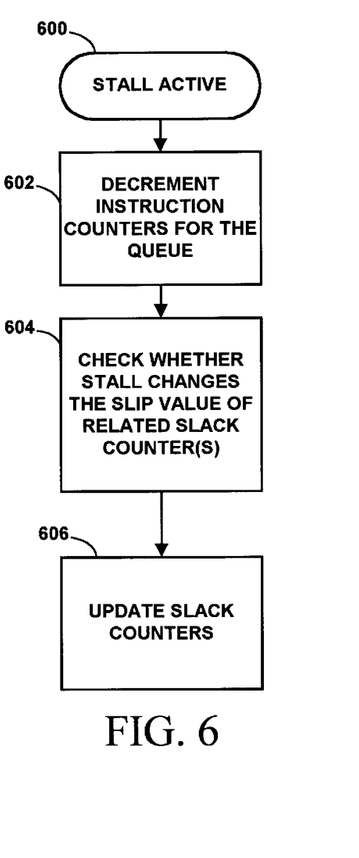
FIG. 6 is a flow diagram illustrating the operation of a stall unit when the issuance of an instruction is stalled to enforce a dependency between instructions in different queues.

FIG. 6 illustrates the operation of the stall unit 90 in the case where the stall unit issues a stall signal (i.e. where the stall signal is active) to enforce a dependency. The stall active notation 600 in FIG. 6 means that the stall unit 90 has issued a stall signal to an instruction issue unit corresponding to one of the queues. For example, let's call the queue for which a stall is active the stalled queue. The stall unit decrements the instruction counters for the set of instructions in the stalled queue that are at the head of the queue (next in line to issue) and have already been associated with an instruction counter. In this context, "associated with an instruction counter" means that a stall value has been computed for the instruction and its corresponding instruction counter has been set. As shown in step 602 of FIG. 6, the stall unit decrements the instruction counters for each of these instructions from the stalled queue.

Next, the stall unit 90 checks whether the stall changes the relative slip between the stalled queue and any of the other queues as shown in step 604. To accomplish this, logic in the stall unit 90 compares the stall signals for the stalled queue and each other queue, and if the values differ, than there is a slip between the stalled queue and the other queue. In this case, the stall unit updates the slack counters 606 accordingly.

Generator-to-User Dependency (Non-unit latency)

For generator-to-user displacement, each instruction has a displacement field for each of the queues, and each field encodes the displacement for the most critical user instruction in the respective queues. This form of encoded dependency uses a separate field to encode the displacement distance from the generator instruction to the most critical user instruction in each of the queues. "Most critical user instruction" refers to the user instruction in the queue that will issue first. It is the most critical for its queue because if the generator's results are available for it, they will be available for the user instructions that are scheduled to issue after it in the queue. In other words, this user instruction will have the worst case latency in terms of the potential stalls needed to wait for the generator instruction.

The number of fields with each instruction is equal to the number of queues. It is possible to avoid using a field for the generator instruction's own queue in cases where the processor or compiler ensures that subsequent instructions in a queue will not use the result of a previous instruction until the result is available.

After the instruction fetch unit 80 decodes an instruction, it first computes the actual displacement from the generator instruction to each of the user instructions based on the encoded displacement distance. For the dependent user instructions in different queues, the actual displacement of the user instructions depends on the displacement distance and the relative slip between the queue of the generator instruction and the queue of the user instruction. For example, if the encoded displacement is 3 relative to a user instruction in queue 2 (assuming the generator instruction is in queue 1 and the user instruction is 3 after the generator instruction) and the relative slip is 2 (queue 2 has fallen behind by 2 instructions), then the actual displacement at this time is 5. Thus, the instruction in queue 2 at a position of 5 instructions behind the generator instruction of queue 1 is the location of the user instruction in queue 2 for which the instruction counter may need to be set. This process of computing the actual displacement is repeated for each queue having a dependent user instruction.

The next step is to compute the stall value for the user instruction's instruction counter. Assume in this example that the latency of the generator instruction is 5 cycles. Since the actual displacement is 5 and the processor issues instructions every cycle (absent stalls), then the new stall value is zero.

The next step is to compare the new stall value with the current value. If the new stall value is less than or equal to the existing stall value, the stall unit does not update the instruction counter for the user instruction. Otherwise, the stall unit changes the stall value to the larger of the new and existing stall values. Thus, in the example above, the stall unit would not change the stall value because the new stall value is zero.

The Compiler

In addition to translating a program's source code into machine executable instructions, the compiler is also responsible for:

1) sorting instructions into instruction queues for execution; and 2) encoding the dependency for each of the instructions in the queues.

The compiler sorts instructions to queues using a topological sort. To compile a program, the compiler first computes a dependency graph for the program. It then sorts the instructions in the graph by the issue time of each instruction such that the instruction with the earliest issue time gets placed in the queue for execution first, then the instruction with the next earliest issue time gets placed in the queue, and so on. Stated another way, the compiler sorts the instructions in their respective queues based on the height of the critical path of each instruction, where the instruction with the longest critical path gets placed in a queue for execution first, and then the next longest, and so on.

Instructions can be sorted into queues based on functionality or known interdependence. In this implementation, the compiler sorts instructions into queues by functionality. In other words, instructions are placed into queues based on their instruction type. It then encodes the displacement distance from the generator to the user instructions for each queue, or the displacement distance from the user to generator instructions as explained above. As noted above, the compiler can also sort instructions into separate queues based on known interdependence. For example, the compiler could sort threads into separate queues. This sorting scheme can encode dependencies in the same fashion.

Figure 7:
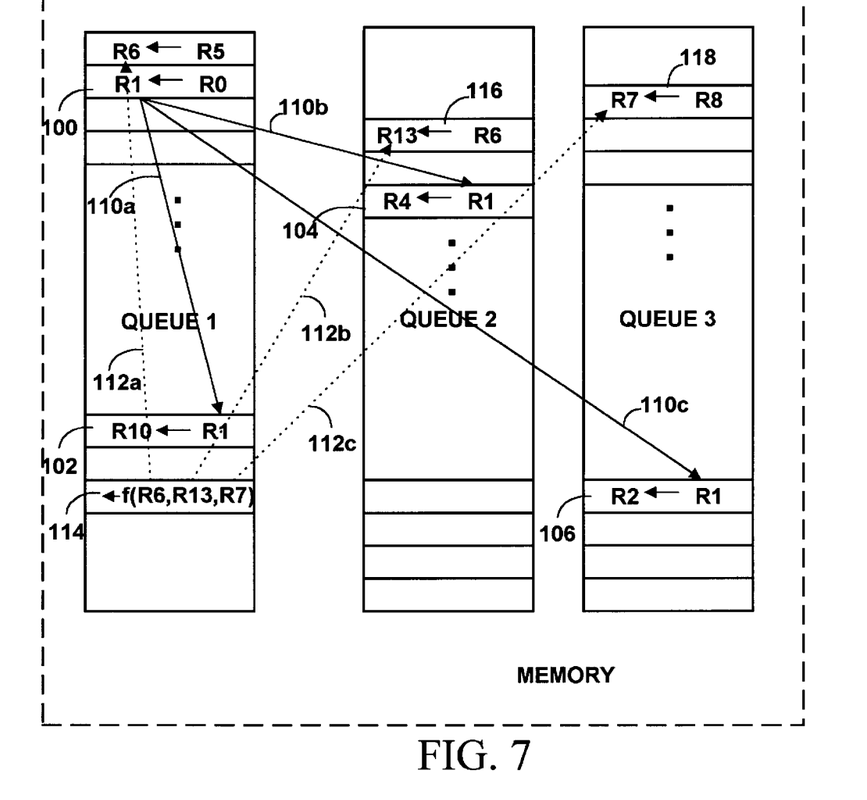
FIG. 7 illustrates an example of generator-to-user instruction displacement for an implementation of the invention with three instruction queues.

FIG. 7 illustrates an example of generator-to-user displacement for an implementation with three instruction queues. In this example, the generator instruction in queue 1 writes a result to register R1. This result is an operand of the user instructions 102, 104, 106) in the first, second, and third queues. Thus, instruction 100 in queue 1 is a generator instruction for user instructions 102, 104 and 106 in queues 1, 2 and 3, respectively. The generator-to-user displacement 100a–c is generally depicted by the solid arrows from the generator instruction 100 to each of its user instructions 102–106.

FIG. 7 also demonstrates user-to-generator displacement. Queue 1 includes an instruction 114 that is a function of R6, R13 and R7. In other words, the registers R6, R13 and R7 hold operands of the user instruction 114 in queue 1. The user-to-generator displacement 112a–c is generally depicted by the dashed lines from the user instruction 114 to each of its generator instructions 100, 116, 118 in queues 1, 2 and 3.

Figure 8:
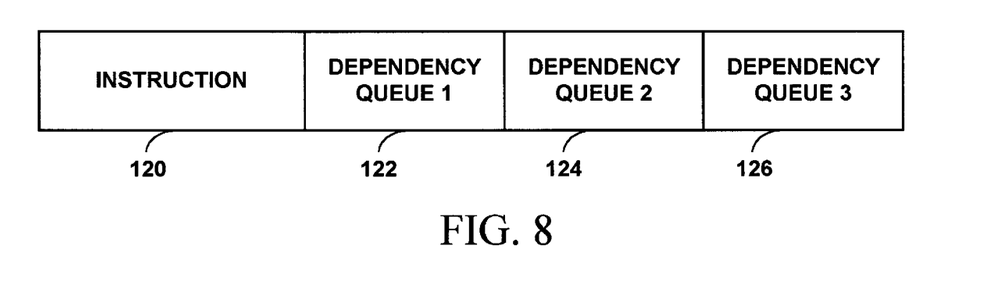
FIG. 8 illustrates an example of the format of an instruction with encoded dependencies.

FIG. 8 illustrates an example of the format of an instruction 120 with encoded dependencies for the example in FIG. 7. To encode this dependency with the generator instruction, the generator instruction 120 has three dependency fields (122, 124, 126), each corresponding to one of the queues. Each field encodes the displacement distance for the generator instruction to the user instruction in the corresponding queue. The same encode applies equally for user-to-generator displacement as well. Specifically, each field 122–126 encodes a user-to-generator displacement for a corresponding queue.

Figure 9:
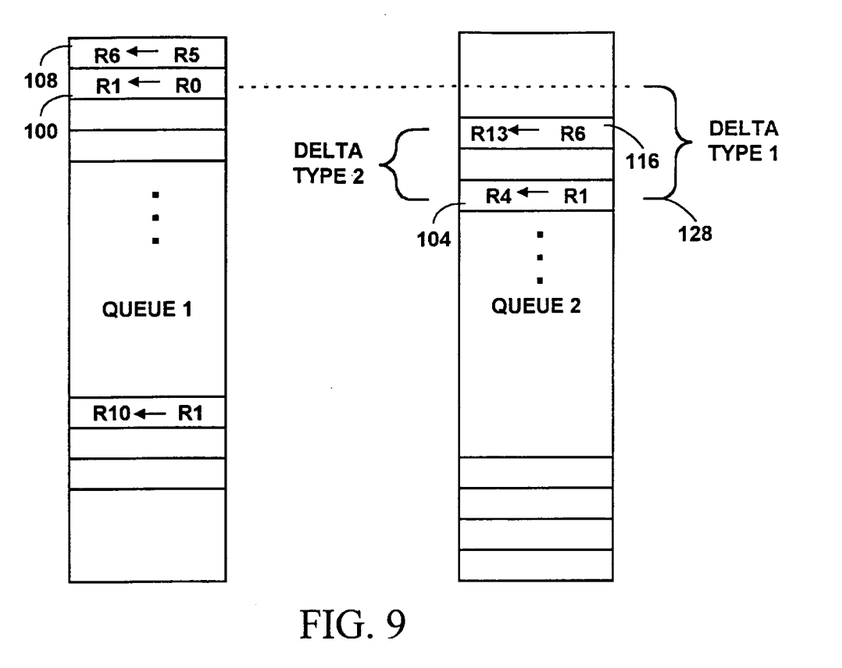
FIG. 9 illustrates alternative ways to compute the generator-to-user instruction displacement.

FIG. 9 illustrates alternative ways to compute instruction displacement. One way to measure the displacement distance is to use the location of the generator instruction as a reference point in the second queue. In other words, find the instruction in queue 2 at the same depth in queue 2 relative to the head of the queue as the generator instruction in queue 1. Then, measure the displacement from this reference point in queue 2 to the user instruction 104 in queue 2. This is shown as Delta type 1 (128) in FIG. 9, which measures the displacement before run time (at compile time) between dependent instructions in different queues. Note that this displacement can be measured in number of instructions of displacement, or some other measure. For example, if it is known that instructions issue each cycle, absent stalls, then the displacement can be measured in cycles, or a displacement initially measured in number of instructions by the compiler can easily be converted into cycles by the processor. Displacement can also be measured in memory units or memory locations (e.g., instruction one is displaced 4 memory locations from instruction two with respect to a common reference location).

Another way to measure the displacement distance is to find the offset distance from a previous user instruction in the same queue as illustrated by Delta type 2 in FIG. 9. This displacement distance (Delta type 2) represents the displacement from the current user instruction 104 to the next most recent user instruction 116 in queue 2. This user instruction 116 is the next most recent user of a result generated by an instruction 110 in queue 1.

Figure 10:
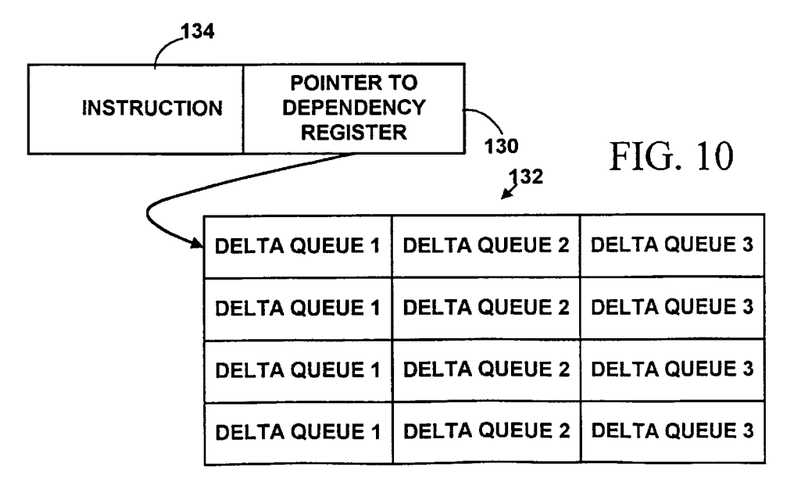
FIG. 10 illustrates an alternative method for encoding dependencies between an instruction and interdependent instructions in other queues.

FIG. 10 illustrates another method for encoding the dependencies. Rather than encoding dependencies in fields along with each instruction, this approach encodes a pointer 130 to a dependency register 132 along with each instruction 134. The dependency register stores the dependency fields for the instruction. For instance, in this example, each entry in the dependency register has a field for each of the queues. These fields store the displacement distance computed using one of the methods described above.

A processor that supports instruction queues should have support for branch instructions. A branch instruction can be treated similarly to the instructions above to enforce its dependencies with instructions in the same or different queues. However, branch instructions differ in that if the branch condition is satisfied, the program counter value can change for each of the queues. The program counter value is the value used by each pair of instruction fetch and issue units to determine which is the next instruction to be fetched and issued from the queue corresponding to these units. One way to deal with a branch instruction is to place the branch instruction in one queue and encode the program counter value for each queue along with the branch instruction. If the branch condition is satisfied, the functional unit associated with executing the branch instruction instructs each of the pairs of instruction fetch and issue units that it should use the new PC value encoded with the branch instruction.

To enforce the branch instruction's dependencies, the processor can use one of the approaches explained in detail above. For instance, the branch instruction can be treated as a user instruction and the instructions that generate the results that it uses can be treated as the generator instructions. Before the instruction issue unit 82 (for branch instructions) issues this branch instruction, it checks the stall signal from the stall unit indicating whether the branch instruction's stall value is zero. Once issued, the functional unit for branch instructions executes the branch instruction. If the branch condition is satisfied, the functional unit communicates the result to the instruction fetch and issue units, which in turn, use the encoded program counter value for each queue to jump to the proper instruction in each queue.

The branch instruction includes fields encoding the location of the instruction in each queue to which the branch instruction may jump to, depending on the result of the branch condition. This location can be encoded in the form of a PC counter distance. To perform the jump in each of the queues, the instruction fetch units 80 include an instruction pointer for each of the queues. This enables the instruction fetch units 80 to jump to the new instruction locations in each of the queues independently and inform the issue units that they will start to issue a new series of instructions from a new part of the respective queues.

Figure 11:
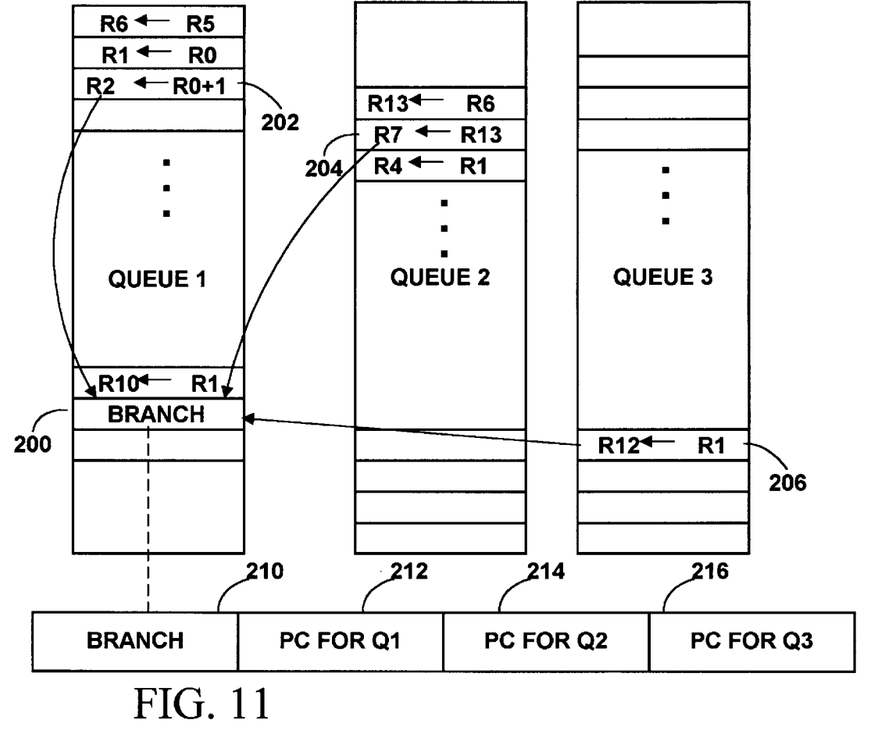
FIG. 11 illustrates an example of one method for supporting branch instructions when instructions are compiled into separate queues.

FIG. 11 illustrates an example of this method for supporting branch instructions in one queue. In this example, queue 1 has a branch instruction that depends on generator instructions (202, 204, and 206) from each of the three queues. Each of the generator operations must be complete before the instruction issue unit issues the branch instruction.

The functional unit for the branch instruction then evaluates the branch instruction. If the branch condition is satisfied, the instruction fetch unit uses the encoded PC distance information to jump to a new instruction in each queue. FIG. 11 includes an example of the branch instruction format, which includes the branch instruction itself 210, and three fields giving the location of the instruction to jump to in each of the three queues. In this example, the branch location is represented as the program counter value to jump to in each of the three queues. When the branch condition is satisfied, the instruction fetch unit, sets the instruction pointer for each of the queues using the program counter value specified in the branch instruction.

Figure 12:
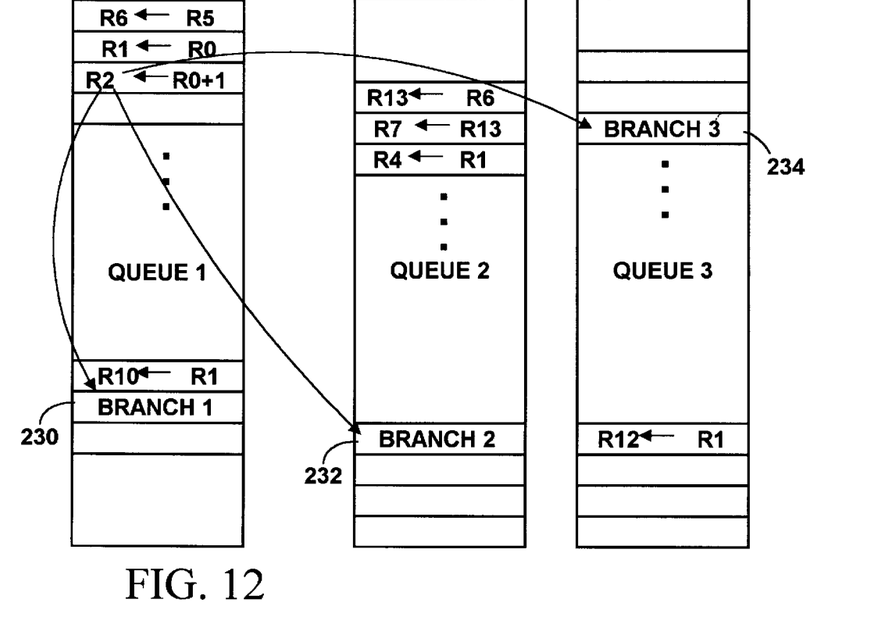
FIG. 12 illustrates an alternative method for implementing branch instructions when instructions are compiled into separate queues.

FIG. 12 illustrates an alternative method for implementing branch instructions. In this method, the compiler divides branch instructions into separate branch instructions (branch 1-230, branch 2-232, branch 3-234) for each of the queues. When the instruction fetch unit reaches a branch instruction, it determines whether it can be issued by using one of the methods for enforcing dependencies described in detail above.

If the branch condition is satisfied, the functional unit sets the instruction pointer for the queue to the program counter value encoded in the branch instruction. This program counter value gives the instruction fetch unit the target instruction within the same queue as the branch instruction. The branch displacement can be positive or negative, meaning that the branch can jump forward or backward in the queue. The processor handles branch instructions in each queue in a similar manner. Each of the branch instructions that the original branch instruction was split into specify the location to jump to within the respective queues.

In view of the many possible implementations to which the principles of our invention may be applied, it should be recognized that the implementations described above are only examples of the invention and should not be taken as a limitation on the scope of the invention. Rather, the scope of the invention is defined by the following claims.

We therefore claim as our invention all that comes within the scope and spirit of these claims:

1. A method for out-of-order execution, the method comprising:

sorting instructions of a program into instruction queues;

encoding dependencies between instructions in a first instruction queue with instructions in another instruction queue, wherein instructions in the instruction queues are encoded with data separate from operands of the instructions identifying an inter-dependent instruction in another instruction queue;

in a processor, independently issuing the instructions in each of the instruction queues in sequential order;

before issuing an instruction from each queue, decoding the encoded dependency or dependencies to identify the inter-dependent instruction in another queue and enforcing the encoded dependency or dependencies of the instruction by determining a stall value from the encoded dependency in the processor and stalling issuance of the instruction based on the stall value until a result of the inter-dependent instruction issued from another queue is available such that encoded dependency or dependencies are satisfied.

2. The method of claim 1 wherein the step of encoding dependencies comprises encoding displacement between an instruction in a first queue and dependent instructions in other queues, the displacement describing the relative locations of the inter-dependent instructions in different queues.

3. The method of claim 2 wherein the step of encoding dependencies comprises encoding the displacement between an instruction in a first queue, on one hand, and a dependent instructions in the same and other queues, on the other hand.

4. The method of claim 1 further including the step of encoding branch instructions which includes:

during a compiling step, placing a branch instruction associated with a branch condition into the first queue and encoding program counter values along with the branch instruction to identifying a target instruction of the branch instruction in each queue;

during execution of the branch instruction, jumping to the target instruction in each queue.

5. The method of claim 1 wherein the instructions of the program are compiled into separate queues based on operation type.

6. The method of claim 5 wherein the instruction of the program are compiled into separate queues including a first queue for memory operations, a second queue for integer operations, and a third queue for floating point operations.

7. Control circuitry in a processor for controlling out-of-order execution of instructions in a computer program, where the instructions of the computer program are sorted into a plurality of instruction queues, the instructions in each of the instruction queues are in a sequential order that is out-of-order relative to the order of the instructions in the computer program, and the instructions in each queue are encoded with dependencies on instructions in other queues, wherein the encoded dependencies comprise data separate from operands of the instructions identifying an inter-dependent instruction in another queue, the control logic comprising;

an instruction fetch unit for fetching instructions from a queue and for decoding the encoded dependencies;

slack counters for keeping track of relative displacement between different queues as instructions are issued independently form each queue, where the relative displacement between the different queues indicates how far ahead or behind a queue is relative to another queue in issuing instructions; and a stall unit in communication with the instruction fetch unit and the slack counters for computing stall values based at least in part on the encoded dependencies and the relative displacement between the different queues, and for issuing a stall signal to stall issuance of a user instruction until a result of a dependent generator instruction from a different queue than the user instruction is available.

8. The control circuitry of claim 7 further including an instruction issue unit in communication with the instruction fetch unit for issuing instructions from an instruction queue in sequential order, and in communication with the stall unit for determining whether to stall issuance of the user instruction to enforce a dependency between the user instruction and the dependent generator instruction.

9. The control circuitry of claim 8 wherein the instructions are sorted into queues based on functional instruction type and further including separate instruction fetch units and separate instruction issue units for each functional instruction type.

10. The control circuitry of claim 7 wherein the stall unit includes a plurality of instruction counters for each queue, where each instruction counter keeps track of a stall value for a corresponding instruction in an instruction queue.

11. The control circuitry of claim 10 wherein the instruction counters rotate such that after an instruction corresponding to a first instruction counter issues, the first instruction counter is used to keep track of a stall value of a subsequent instruction in the same queue as the first instruction.

12. The control circuitry of claim 10 wherein the instruction counters associated with a first queue are decremented when issuance of an instruction from the first queue is stalled so that stall values associated with instructions in the same queue are combined.

13. The control circuitry of claim 7 further including separate instruction fetch units corresponding to separate queues and separate functional units in the processor, and wherein instruction fetch units and functional units related by functional type of instruction are located in proximity to each other in the processor to minimize chip delays.

14. A method for out-of-order execution of instructions in a computer program where the instructions of the program are sorted into instruction queues, the method comprising:

fetching instructions from the instruction queues, where each of the instructions in the queues have encoded dependency data separate from operands of the instructions identifying dependent instructions located in one or more different queues;

decoding the dependency data of each instruction;

independently issuing instructions from each queue in sequential order such that the instructions are issued out-of-order relative to the order of the instructions in an uncompiled version of the program;

using the dependency data to compute a stall value to ensure that a user instruction is not issued until a result of a dependent generator instruction in another queue is available; and stalling issuance of the user instruction until the result of the dependent generator instruction is available.

15. The method of claim 14 further including:

keeping track of relative displacement between the queues to determine how far ahead or behind each queue is with respect to other queues as the instructions are issued independently from each queue; and using the encoded dependency data and the relative displacement to compute the stall value.

16. The method of claim 15 wherein the step of keeping track of the relative displacement comprises using a plurality of slack counters to measure the relative displacement between the queues; and updating a slip value when issuance of an instruction from one of the queues is stalled and the relative displacement between the queues changes.

17. The method of claim 15 further including:

using the encoded dependency data, the relative displacement and the known dependency of the generator instruction to compute the stall value to ensure that the user instruction is not issued until the result of the dependent generator instruction is available.

18. The method of claim 14 wherein the instructions in each queue have unit latency, and the encoded dependency data includes displacement distances between a user instruction in first queue and at least two generator instructions in different queues from the first queue; and further including the step of:

using the displacement distances and the relative displacement to compute the stall value;

stalling issuance of the user instruction until after the generator instructions have been issued.

19. The method of claim 14 wherein the instructions in each queue have non-unit latency, and the encoded dependency data includes displacement distances between a user instruction in a first queue and at least two generator instructions in different queues from the first queue; and further including the step of:

using the displacement distances, the relative displacement, and the known dependency of the generator instruction to compute the stall value; and stalling issuance of the user instruction until after the results of the generator instruction are available.

20. The method of claim 14 wherein the instructions in each queue have non-unit latency, and the encoded dependency data includes displacement distances between a generator instruction in a first queue and at least two user instructions in different queues from the first queue; and farther including the step of:

using the displacement distances, the relative displacement, and the known dependency of the generator instruction to compute stall values for each of the user instructions; and stalling issuance of each of the user instructions until after results of the generator instruction are available.

* * * * *